(12) United States Patent
Bertelo et al.

(10) Patent No.: US 7,015,282 B1
(45) Date of Patent: Mar. 21, 2006

(54) IMPACT ADDITIVE OF THE CORE/SHELL TYPE FOR THERMOPLASTIC POLYMERS

(75) Inventors: Chris Bertelo, Scotch Plains, NJ (US); Gilles Meunier, Mazerolles (FR); André Lermite, Lescar (FR); Pascale Dargelos, Billero (FR); Xavier Drujon, Jurancon (FR)

(73) Assignee: Arkema Inc., Philadelphia, PA (US)

( * ) Notice: Subject to any disclaimer, the term of this patent is extended or adjusted under 35 U.S.C. 154(b) by 0 days.

(21) Appl. No.: 09/088,707

(22) Filed: Jun. 2, 1998

Related U.S. Application Data

(62) Division of application No. 08/738,768, filed on Oct. 28, 1996, now Pat. No. 5,773,520.

(30) Foreign Application Priority Data

Oct. 27, 1995 (FR) .................................. 95 12706

(51) Int. Cl.
*C08L 51/00* (2006.01)

(52) U.S. Cl. ............................ 525/64; 525/66; 525/67; 525/71; 525/307; 525/309; 525/310

(58) Field of Classification Search ................ 525/307, 525/309, 310, 67, 71, 64, 66
See application file for complete search history.

(56) References Cited

U.S. PATENT DOCUMENTS

| | | | |
|---|---|---|---|
| 3,678,133 A | | 7/1972 | Ryan ...................... 260/876 R |
| 4,659,767 A | * | 4/1987 | Dunkle et al. .............. 524/504 |
| 4,788,251 A | * | 11/1988 | Brown et al. .................. 525/67 |
| 5,045,595 A | * | 9/1991 | Wang .......................... 525/66 |
| 5,221,713 A | | 6/1993 | Kempner et al. ............. 525/71 |
| 5,237,004 A | | 8/1993 | Wu et al. ...................... 525/85 |
| 5,346,954 A | * | 9/1994 | Wu et al. ...................... 525/64 |
| 5,360,865 A | | 11/1994 | Aoyama et al. .............. 525/67 |
| 5,773,520 A | * | 6/1998 | Bertelo et al. .............. 525/309 |

* cited by examiner

*Primary Examiner*—Jeffrey Mullis
(74) *Attorney, Agent, or Firm*—Thomas F. Roland

(57) ABSTRACT

The invention relates to an impact additive of the core/shell type for thermoplastic polymers. This impact additive comprises a crosslinked elastomeric core based on n-alkyl acrylate and a shell made of poly(alkyl methacrylate) grafted onto said core.

47 Claims, No Drawings

IMPACT ADDITIVE OF THE CORE/SHELL TYPE FOR THERMOPLASTIC POLYMERS

This application is a divisional application of U.S. Ser. No. 08/738,768, filed Oct. 28, 1996 and resulting in U.S. Pat. No. 5,773,520.

BACKGROUND OF THE INVENTION

The invention relates to an impact additive of the core/shell type as well as to a composition containing a thermoplastic polymer, in particular a vinyl chloride homopolymer or a copolymer mostly containing vinyl chloride, an impact additive of the core/shell type and optionally other additives.

Some synthetic resins, in particular resins based on poly(vinyl chloride) or on a copolymer mostly containing vinyl chloride, are widely used in the building industry, in particular due to their low cost and to their good physical and/or chemical properties.

Nevertheless, they exhibit low impact strengths at ambient temperature or at low temperature or again also after ageing.

It has been proposed to overcome these defects by incorporating, in these thermoplastic resins, products known as impact additives which are generally polymers exhibiting a degree of elastomeric properties.

A description is given in U.S. Pat. No. 3,678,133 of an impact additive of the core/shell type composed of an elastomeric core and of a more rigid thermoplastic shell.

The elastomeric core is obtained by polymerization of a mixture of monomers comprising at least 50% by weight of an alkyl acrylate, the alkyl group of which has from 2 to 8 carbon atoms, and a minor proportion of a crosslinking agent. The preferred alkyl acrylate is n-butyl acrylate.

It is also mentioned that alkyl acrylates having longer chains exhibit the disadvantage of polymerizing with greater difficulty, 2-ethylhexyl acrylate being given as an example.

The rigid thermoplastic shell is obtained by polymerization of a mixture of monomers comprising 40% to 100% by weight of alkyl methacrylate in which the alkyl group contains 1 to 4 carbon atoms.

The impact additive in this patent is produced in such a way that the polymerization of the rigid thermoplastic shell takes place at the surface of the elastomeric phase, preferably as a separate layer which more or less completely covers the elastomeric core.

Although the impact additives thus obtained significantly improve the impact strength at ambient temperature of the resins containing them, there is a loss in the mechanical properties, in particular a loss in the impact strength, at low temperature, of the said resins.

SUMMARY OF THE INVENTION

An impact additive of the core/shell type has now been found which is composed of a core based on alkyl acrylate or on a polyorganosiloxane rubber and a shell based on poly(alkyl methacrylate), or on a styrene-acrylonitrile copolymer, characterized in that the said impact additive comprises from:

a) 70% to 90% by weight, and preferably 75% to 85%, of an elastomeric crosslinked core which is composed:
  1) of 20% to 100% by weight, and preferably of 20% to 90%, of a nucleus composed of a copolymer (I) of n-alkyl acrylate, the alkyl group of which has a carbon number ranging from 5 to 12, and preferably ranging from 5 to 8, or of a mixture of alkyl acrylates, the linear or branched alkyl group of which has a carbon number ranging from 2 to 12, and preferably ranging from 4 to 8, or of a polyorganosiloxane rubber, of a polyfunctional crosslinking agent possessing unsaturated groups in its molecule, at least one of which is of $CH_2=C<$ vinyl type, and optionally of a polyfunctional grafting agent possessing unsaturated groups in its molecule, at least one of which is of $CH_2=CH-CH_2-$ allyl type, the said nucleus containing a molar amount of crosslinking agent and optionally of grafting agent ranging from 0.05% to 5% and preferably an amount of between 0.5% and 1.5%;
  2) of 80% to 0% by weight, and preferably of 80% to 10%, of a covering composed of a copolymer (II) of n-alkyl acrylate, the alkyl group of which has a carbon number ranging from 4 to 12, and preferably ranging from 4 to 8, or of a mixture of alkyl acrylates as defined above in 1) and of a polyfunctional grafting agent possessing unsaturated groups in its molecule, at least one of which is of $CH_2=CH-CH_2-$ allyl type, the said covering containing a molar amount of grafting agent ranging from 0.05% to 2.5% and preferably an amount of between 0.5% and 1.5%;

b) 30% to 10% by weight, and preferably 25% to 15%, of a shell grafted onto the said core composed of a polymer of an alkyl methacrylate, the alkyl group of which has a carbon number ranging from 1 to 4, or alternatively of a statistical copolymer of an alkyl methacrylate, the alkyl group of which has a carbon number ranging from 1 to 4, and of an alkyl acrylate, the alkyl group of which has a carbon number ranging from 1 to 8, containing a molar amount of alkyl acrylate ranging from 5% to 40%, and preferably of between 10% and 20%, or alternatively composed of a styrene-acrylonitrile copolymer having a preferred styrene:acrylonitrile molar ratio between 1:1 and 4:1, and particularly between 7:3 and 3:1, respectively.

Mention will be made, as illustration of n-alkyl acrylates which can be used according to the present invention to form the copolymer (I), of n-pentyl acrylate, n-hexyl acrylate, n-heptyl acrylate and very particularly n-octyl acrylate.

Mention will be made, as illustration of n-alkyl acrylates which can be used according to the present invention to form the copolymer (II), of n-butyl acrylate, n-pentyl acrylate, n-hexyl acrylate, n-heptyl acrylate and very particularly n-octyl acrylate.

The n-alkyl acrylate which may be used to form the copolymers (I) and/or (II) can be identical or different.

Mention will be made, as illustration of linear or branched alkyl acrylates which can be used according to the present invention for the formation of the mixtures of alkyl acrylates constituting the copolymers (I) and/or (II), of ethyl acrylate, n-propyl acrylate, n-butyl acrylate, amyl acrylate, 2-methylbutyl acrylate, 2-ethylhexyl acrylate, n-hexyl acrylate, n-octyl acrylate, n-decyl acrylate, n-dodecyl acrylate or 3,5,5-trimethylhexyl acrylate.

In the case where a mixture of alkyl acrylates is used to produce the copolymers (I) and/or (II), use will be made of an amount by weight of n-alkyl acrylate at least equal to 10% by weight of the mixture of alkyl acrylates and preferably an amount of between 20% and 80%.

As above, use may be made, to form the copolymers (I) and/or (II), of a mixture of identical or different alkyl acrylates.

According to the present invention, it is preferable to use n-alkyl acrylates and very particularly n-octyl acrylate to form the copolymers (I) and (II).

If a mixture of alkyl acrylates is used to form the copolymers (I) and/or (II), use will preferably be made of 20% to 80% by weight of n-octyl acrylate and preferably of 80% to 20% by weight of n-butyl acrylate.

Mention will be made, as illustration of alkyl methacrylates which can be used to form the shell grafted onto the crosslinked elastomeric core according to the present invention, of ethyl methacrylate, n-propyl methacrylate, isopropyl methacrylate, n-butyl methacrylate, isobutyl methacrylate and very particularly methyl methacrylate.

According to the present invention, the crosslinking agent used to form the copolymer (I) can in particular be chosen from derivatives possessing at least two double bonds of the vinyl type or alternatively possessing one or a number of double bonds of the vinyl type and at least one double bond of the allyl type. Use will preferably be made of compounds possessing, in their molecules, a majority of double bonds of the vinyl type.

Mention will be made, as illustration of such crosslinking agents, of divinylbenzenes, polyalcohol (meth)acrylates, such as trimethylol propane triacrylate or trimethacrylate, allyl acrylate or methacrylate, alkylene glycol diacrylates or dimethacrylates having 2 to 10 carbon atoms in the alkylene chain and in particular ethylene glycol diacrylate or dimethacrylate, 1,4-butanediol diacrylate or dimethacrylate or 1,6-hexanediol diacrylate or dimethacrylate, or polyoxyalkylene glycol diacrylate or dimethacrylate of formula

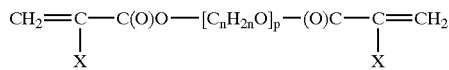

in which X represents a hydrogen atom or the methyl radical, n is an integer ranging from 2 to 4 and p is an integer ranging from 2 to 20 and in particular polyoxyethylene glycol diacrylate or dimethacrylate in which the polyoxyethylene radical has a molecular mass of approximately 400 (abovementioned formula with n=2 and p=9).

According to the present invention, the grafting agent used to form the copolymer (II) can be in particular chosen from derivatives possessing at least two double bonds of the allyl type or alternatively possessing one or a number of double bonds of the allyl type and at least one double bond of the vinyl type.

Use will preferably be made of compounds possessing, in their molecules, a majority of double bonds of the allyl type.

Mention will be made, as illustration of such grafting agents, of diallyl maleate, diallyl itaconate, allyl methacrylate or acrylate, triallyl cyanurate, triallyl isocyanurate, diallyl terephthalate or triallyl trimesate.

According to an alternative from in accordance with the invention, the nucleus of the crosslinked elastomeric core can be composed entirely of a polyorganosiloxane rubber obtained by emulsion polymerization of an organosiloxane in the presence of a crosslinking agent and, optionally, of a grafting agent.

Mention may be made, as illustration of organosiloxanes, of cyclic siloxanes composed of rings having a number of Si—C ring members ranging from 3 to 6, such as hexamethylcyclotrisiloxane, octamethylcyclotetrasiloxane, dodecamethylcyclotetrasiloxane or octaphenylcyclotetrasiloxane.

Mention may be made, as crosslinking agent which can be used, of a crosslinking agent of the tri- or tetrafunctional silane type, such as, for example, trimethoxysilane or tetraethoxysilane.

Use will preferably be made, as grafting agent, of a methacryloyloxysiloxane of formula:

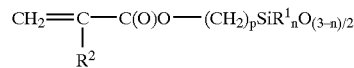

in which R.sup.1 represents a methyl, ethyl, propyl or phenyl group, $R^2$ represents a hydrogen atom or a methyl group, n has a value 0, 1 or 2 and p is a number ranging from 1 to 6.

Mention may be made, as illustration of methacryloyloxysiloxane, of:

β-methacryloyloxyethyldimethoxymethylsilane,
γ-methacryloyloxypropylmethoxydimethylsilane,
γ-methacryloyloxypropyldimethoxysilane,
γ-methacryloyloxypropyltrimethoxysilane,
γ-methacryloyloxypropylethoxydiethylsilane,
γ-methacryloyloxypropyldiethoxymethylsilane, and
γ-methacryloyloxybutyldiethoxymethylsilane.

The polyorganosiloxane rubber can be produced by a process described, for example, in European Patent EP 0,326,038. Use will very particularly be made of the procedure described in the example of reference 1 of the said patent, which makes it possible to obtain a polyoctamethylcyclotetrasiloxane rubber latex.

According to this alternative from, the crosslinked elastomeric core can contain no more than 40% by weight of a nucleus composed of a polyorganosiloxane rubber as described above.

The invention also relates to a composition comprising a thermoplastic polymer and the impact additive as defined above.

The thermoplastic polymer can be composed of one or a number of polymers of the polycondensates type, in particular polyamides, polyetheresteramides (PEBAX), polyesters, such as polybutylene terephthalate, polycarbonates or alloys of the abovementioned polymers, such as alloys of polycarbonates and of polyesters, such as XENOY. The thermoplastic polymer can also be composed of one or a number of polymers chosen from the group formed by poly(alkyl methacrylate)s and in particular poly(methyl methacrylate) or by vinyl chloride homopolymers, which can optionally be superchlorinated, and copolymers which result from the copolymerization of vinyl chloride with one or a number of ethylenically unsaturated comonomers and which contain at least 80% by weight of polymerized vinyl chloride. Examples of monomers which are suitable for the preparation of such copolymers are in particular vinylidene halides, such as vinylidene chloride or fluoride, vinyl carboxylates, such as vinyl acetate, vinyl propionate or vinyl butyrate, acrylic and methacrylic acids and the nitriles, amides and alkyl esters which derive therefrom, in particular acrylonitrile, acrylamide, methacrylamide; methyl methacrylate, methyl acrylate, butyl acrylate, ethyl acrylate or 2-ethylhexyl acrylate, vinylaromatic derivatives, such as styrene or vinylnapthalene, or olefins, such as bicyclo [2.2.1] hept-2-ene, bicyclo [2.2.1]hepta-2,5-diene, ethylene, propene or 1-butene.

The thermoplastic polymer can also be composed of a homopolymer of a vinylidene halide, such as 1,1-dichloroethylene or 1,1-difluoroethylene.

The thermoplastic polymer is preferably a vinyl chloride homopolymer or a poly(butylene terephthalate).

The preferred content of impact additive incorporated in the thermoplastic polymer is between 1 and 30 parts by weight, and preferable between 5 and 10 parts by weight, per 100 parts by weight of the thermoplastic polymer used.

In order to describe the molecular mass of the impact additive, it is possible to define a viscosity in the molten state which varies in the same sense. The said viscosity in the molten state may be situated in a fairly wide range, provided that the impact additive is well dispersed during the operations in which the resin composition, including the said additive, is made use of. As representative magnitude of this viscosity in the molten state, the value of the resisting torque of a Brabender rheometer containing 50 g of impact additive and operating at a temperature of 200° C. with a rotational speed of its rotors equal to 40 revolutions per minute may suitably be taken, the torque being determined after holding at 200° C. for 20 minutes. Appropriate values of the viscosity in the molten state for the impact additive correspond to values of the abovementioned torque of between 600 and 4000 m.g. In the case of resin compositions for which the thermoplastic polymer is a polymer containing at least 80% by weight of polymerized vinyl chloride, preferred viscosity values in the molten state for the impact additive correspond to values of the said torque ranging from 800 to 3000 m.g. and very particularly from 1000 to 2500 m.g.

Another subject of the invention is a process for producing the said impact additive.

One process comprises the preparation, in a first state, of a crosslinked core composed of a nucleus and of a covering and then, in a second stage, a poly(alkyl methacrylate) shell is grafted onto the said crosslinked core obtained in the first stage.

According to a preferred method, the crosslinked core, composed of a nucleus and of a covering, is prepared and the grafting operation is carried out by using emulsion polymerization techniques. In this case, the following procedure can be used.

In a first stage, an emulsion is prepared which contains, per part by weight of monomers to be polymerized, 1 to 10 parts of water, 0.001 to 0.03 parts of an emulsifying agent, a major portion of the n-alkyl acrylate or of the mixture of alkyl acrylates as defined above to be polymerized in order to form the said core and at least one polyfunctional crosslinking agent. The reaction mixture thus formed is stirred and maintained at a temperature ranging from 55° C. to 65° C. and preferably at a temperature in the region of 60° C. 0.001 to 0.5 parts of a catalyst which generates free radicals is then added and the reaction mixture thus formed is maintained at a temperature of, for example, between ambient temperature and 100° C. and with stirring for a period sufficient to obtain a virtually complete conversion of the monomers. The minor portion of n-alkyl acrylate or of the mixture of alkyl acrylates and the grafting agent, as well as, at the same time, 0.001 to 0.005 part of a catalyst which generates free radicals, are then added simultaneously to the phase thus obtained.

This second operation of the first stage, which comprises the production of the covering, is generally carried out at a temperature greater than that used for the preparation of the nucleus. This temperature is not greater than 100° C. and preferably between 60° C. and 90° C.

An alternative from of this first stage comprises the production of the crosslinked core in a single operation by simultaneously introducing the crosslinking agent and the grafting agent (or a compound which plays both the crosslinking role and the grafting role) into the reaction mixture.

In a second stage, the said core is grafted with an alkyl methacrylate. To do this, an appropriate amount of the said methacrylate is added to the reaction mixture resulting from the first stage, in order to obtain a grafted copolymer containing the desired content of grafted chains, as well as, if appropriate, additional amounts of emulsifying agent and of a radical catalyst also within the ranges defined above, and the mixture thus formed is maintained at a temperature within the above mentioned range, with stirring, until virtually complete conversion of the grafting monomers is obtained.

Use may be made, as emulsifying agent, of any one of the known surface-active agents, whether anionic, nonionic or even cationic. In particular, the emulsifying agent may be chosen from anionic emulsifying agents, such as sodium or potassium salts of fatty acids, in particular sodium laurate, sodium stearate, sodium palmitate, sodium oleate, mixed sulphates of sodium or of potassium and of fatty alcohols, in particular sodium lauryl sulphate, sodium or potassium salts of sulphosuccinic esters, sodium or potassium salts of alkylarylsulphonic acids, in particular sodium dodecylbenzenesulphonate, and sodium or potassium salts of fatty monoglyceride monosulphonates, or alternatively from nonionic surfactants, such as the reaction products of ethylene oxide and of alkylphenol or of aliphatic alcohols, alkylphenols. Use may also be made of mixtures of such surface-active agents, if need be.

The catalysts capable of being employed, both in the abovementioned first emulsion polymerization stage and in the abovementioned second emulsion polymerization stage, are compounds which give rise to free radicals under the temperature conditions chosen for the polymerization. These compounds can in particular be peroxide compounds, such as hydrogen peroxide; alkali metal persulphates and in particular sodium or potassium persulphate; ammonium persulphate; percarbonates; peracetates, perborates; peroxides such as benzoyl peroxide or lauroyl peroxide; or hydroperoxides such as cumene hydroperoxide, diisopropylbenzene hydroperoxide, para-menthane hydroperoxide or tert-butyl hydroperoxide.

However, it is preferable to use catalytic systems of redox type formed by the combination of a peroxide compound, for example as mentioned above, with a reducing agent, in particular such as alkali metal sulphite, alkali metal bisulphite, sodium formaldehyde sulphoxylate ($NaHS_2.HCHO$), ascorbic acid, glucose, and in particular those of the said catalytic systems which are water-soluble, for example potassium persulphate/sodium metabisulphite or alternatively diisopropylbenzene hydroperoxide/sodium formaldehyde sulphoxylate.

It is also possible to add, to the polymerization mixture of one and/or other of the stages, chain-limiting compounds, and in particular mercaptans such as tert-dodecyl mercaptan, isobutyl mercaptan, n-octyl mercaptan, n-dodecyl mercaptan or isooctyl mercaptopropionate, for the purpose of controlling the molecular mass of the core and/or of the chains grafted onto the nucleus, or alternatively compounds such as phosphates, for the purpose of controlling the ionic strength of the polymerization mixture.

The reaction mixture obtained on conclusion of the second emulsion polymerization stage, which is composed of an aqueous emulsion of the additive according to the invention, is then treated in order to separate the said additive therefrom. To do this, it is possible, for example, to subject the emulsion, according to the surfactant used, to a coagulating treatment by bringing into contact with a saline solution ($CaCl_2$ or $AlCl_3$) or a solution acidified with concentrated sulphuric acid and then to separate, by filtration, the solid product resulting from the coagulating, the said solid product then being washed and dried to give a graft copolymer as a powder. It is also possible to recover the additive contained in the emulsion by using a spray-drying technique.

The resulting additive exists in the form of a powder, the particle size of which can range from a few microns, for example 0.05 to 5 microns, to 200 to 300 microns, the said particle size depending on the technique used to separate the graft copolymer from the emulsion polymerization mixture.

The composition according to the invention can be prepared by any method which makes it possible to produce a homogeneous mixture containing a thermoplastic polymer, the impact additive according to the invention and optionally other additives. It is possible, for example, to dry-mix the ingredients constituting the resin composition, then to extrude the resulting mixture and to reduce the extrudate to pellets. When the thermoplastic polymer is obtained by emulsion polymerization, it may be convenient to mix the emulsion containing the additive according to the invention with the emulsion of the thermoplastic polymer and to treat the resulting emulsion in order to separate therefrom the solid product which it contains, as described-above with respect to the separation of the additive.

The additives, other than the impact additive, which may optionally be present in the resin compositions according to the invention are in particular those such as pigments, dyes, plasticizers, antioxidants, heat stabilizers, processing additives or lubricants.

The PVC composition obtained according to the present invention exhibits excellent impact strength at ambient temperature as well as at temperatures as low as –30° C. or even –40° C.

The composition of the present invention can advantageously be used to produce sections or claddings used in particular in the building industry or alternatively to produce pipes which can be used for conveying water.

The following examples illustrate the invention.

EXAMPLE 1

According to the Invention

The preparation is carried out in a 2-liter reactor equipped with a stirrer device and a temperature recorder and provided with a jacket through which passes a heat-transfer fluid for maintaining the temperature of the reactor.

1) Preparation of the Crosslinked Elastomeric Core of the Impact Additive:

800 g of demineralized water and 2.46 g of disodium phosphate are introduced, after having degassed with nitrogen, into the reactor described above, maintained at ambient temperature and with stirring, and then 20.58 g of sodium lauryl sulphate are dissolved in this mixture as emulsifying agent.

The temperature of the contents of the reactor is then brought to 57° C. and 423 g of n-octyl acrylate and 5.08 g of 1,4-butanediol diacrylate are then added simultaneously to the said contents, while maintaining this temperature.

The temperature of the reactor is brought to 63° C. and 0.41 g of sodium metabisulphite in 5.59 ml of water and 0.62 g of potassium persulphate in 6.58 ml of water are ten added to the reaction mixture as catalytic system. The reaction is then allowed to continue for 2 hours, the temperature of the reactor is then brought to 80° C. and 47 g of n-octyl acrylate, 2.36 g of diallyl maleate and 0.8 g of potassium persulphate are then added simultaneously.

The temperature of the reactor is maintained at 80° C. for 1 hour. A crosslinked elastomeric core is obtained, with a conversion of 98%, consisting of:
1) 89.66% by weight of a nucleus composed of an n-octyl acrylate/1,4-butanediol diacrylate copolymer (I) and of
2) 10.34% by weight of a covering composed of an n-octyl acrylate/diallyl maleate copolymer (II).

This core contains, in moles, 1% of 1,4-butanediol diacrylate and 0.47% of diallyl maleate.

2) Grafting of the Methyl Methacrylate onto the Crosslinked Elastomeric Core:

118 g of methyl methacrylate are continuously added over one hour, with stirring, to the reaction mixture obtained above maintained at 80° C. 1.7 g of diisopropylbenzene hydroperoxide in 78 ml of water and 0.2 g of sodium formaldehyde sulphoxylate in 4 ml of water are also added at the same time.

The contents of the reactor are maintained at 80° C. for 1.5 hours, after the beginning of the introduction of the methyl methacrylate, and 0.31 g of tert-butyl hydroperoxide and 0.8 g of sodium metabisulphite in 15 ml of water are added to the said contents. The reaction mixture is then maintained at 80° C. for one hour. At the end of this period, the contents of the reactor are cooled to ambient temperature and the grafted copolymer latex produced, the mean particle diameter of which is 0.08 µm, is coagulated in a saline solution acidified with concentrated sulphuric acid. The coagulated product is then filtered, washed and then dried to give a powder constituting the impact additive.

The conversion of the methyl methacrylate during the grafting is 99%. The impact additive contains a proportion of grafted poly(methyl methacrylate) chains representing 19.82% by weight of the additive and has a viscosity in the molten state corresponding to a value equal to 1400 m.g. of the torque of the Brabender rheometer operating under the conditions defined above.

EXAMPLE 2

In Accordance with the Invention

1) Preparation of the Crosslinked Elastomeric Core of the Impact Additive:

2000 g of demineralized water and 5.85 g of disodium phosphate are introduced, after having degassed with nitrogen, into a 5-liter reactor equipped as described in Example 1 maintained at room temperature and with stirring and then 245 g of sodium lauryl sulphate are dissolved in this mixture as emulsifying agent.

The temperature of the contents of the reactor are then brought to 57° C. and 904.5 g of n-octyl acrylate, 301.5 g of n-butyl acrylate and 14.4 g of 1,4-butanediol diacrylate are then simultaneously added to the said contents, while maintaining this temperature.

The temperature of the reactor is brought to 63° C. and 22.6 g of sodium bisulphite in 10 ml of water and 1.60 g of potassium persulphate in 33.83 ml of water are then added to the reaction mixture as catalytic system. The reaction is then allowed to continue under adiabatic conditions for 2 hours, the temperature of the reactor is then brought to 80° C. and 100.5 g of n-octyl acrylate, 33.5 g of n-butyl acrylate, 6.71 g of diallyl, maleate and 0.17 g of potassium persulphate in 3.73 ml of water are then added simultaneously.

The temperature of the reactor is maintained at 80° C. for 1 hour.

A crosslinked elastomeric core is obtained, with a conversion of 95.72%, consisting of:
1) 89.66% by a nucleus composed of an n-octyl acrylate/n-butyl acrylate/1,4-butanediol diacrylate copolymer (I) and of
2) 10.34% by weight of a covering composed of an n-octyl acrylate/n-butyl acrylate/dialkyl maleate copolymer (II).

2) Grafting of the Methyl Methacrylate onto the Crosslinked Elastomeric Core:

335.3 g of methyl methacrylate are continuously added over one hour, with stirring, to the reaction mixture obtained above maintained at 80° C. 4.3 g of diisopropylbenzene hydroperoxide in 195.7 ml of water and 0.40 g of sodium formaldehyde sulphoxylate in 9.28 ml of water are also added at the same time.

The contents of the reactor are maintained at 80° C. for 1.5 hours, after the beginning of the introduction of the methyl methacrylate, and 0.24 g of tert-butyl hydroperoxide and 4.6 g of sodium bisulphite in 17 ml of water are added to the said contents. The reaction mixture is then maintained at 80' for one hour. At the end of this period, the contents of the reactor are cooled to ambient temperature and the grafted copolymer latex produced is coagulated in a saline solution acidified with concentrated sulphuric acid. The coagulated product is then filtered, washed and then dried to give a powder constituting the impact additive.

The conversion of the methyl methacrylate during the grafting is 98.27%. The impact additive contains a proportion of grafted poly(methyl methacrylate) chains representing 19.77% by weight of the additive and has a viscosity in the molten state corresponding to a value equal to 1500 m.g. of the torque of the Brabender rheometer operating under the conditions defined above.

In Examples 3 to 7, the preparation is carried out according to the same operating conditions of Example 1, using, for the crosslinked elastomeric core as for the shell grafted onto the said core, the same reactants (grafting and crosslinking agents, catalysts, emulsifiers, and the like) in identical amounts by weight, except that, for the preparation of the crosslinked elastomeric core, use is made of identical amounts by weight of an alkyl acrylate other than n-octyl acrylate, to produce the copolymers (I) and (II).

In Example 3, n-heptyl acrylate is used.

In Example 4, n-hexyl acrylate is used.

In Example 5, n-pentyl acrylate is used.

In Example 6 (not in accordance with the invention), n-butyl acrylate is used.

In Example 7 (not in accordance with the invention), 2-ethylhexyl acrylate is used.

Impact additives are obtained which contain, as in Example 1, a crosslinked elastomeric core, obtained with yields greater than 98%, consisting of:
1) approximately 90% by weight of a nucleus composed of an alkyl acrylate/1,4-butanediol diacrylate copolymer (I) and of
2) approximately 10% by weight of a covering composed of an alkyl acrylate copolymer (II) identical to that used in 1/dialkyl maleate, and a shell, made of poly(methyl methacrylate), grafted onto the said core and representing approximately 20% by weight of the impact additive.

EXAMPLE 8

In Accordance with the Invention

1) Preparation of the Crosslinked Elastomeric Core of the Impact Additive:

750 g of demineralized water, 2.46 g of disodium phosphate and 0.41 g of sodium metabisulphite in 7.59 ml of water are introduced, after having degassed with nitrogen, into the reactor described in Example 1, maintained at ambient temperature and with stirring, and then 100 g of sodium lauryl sulphate are dissolved in this mixture as emulsifying agent.

The temperature of the contents of the reactor is then brought to 57° C. and 117.5 g of a n-octyl acrylate and 1.21 g of allyl methacrylate are then added simultaneously to the said contents, while maintaining this temperature.

The temperature of the reactor is brought to 63° C. and 0.13 g of potassium persulphate in 2.67 ml of water is then added to the reaction mixture. The reaction is then allowed to continue for 45 minutes, the temperature of the reactor is then brought to 80° C. and 353 g of n-butyl acrylate, 5.21 g of allyl methacrylate and 0.5 g of potassium persulphate in 10.7 ml of water are then added simultaneously.

The temperature of the reactor is maintained at 80° C. for 1 hour.

A crosslinked elastomeric core is obtained, with a conversion of 99.9%, consisting of
1) 24.89% by weight of a nucleus composed of an n-octyl acrylate/allyl methacrylate copolymer (I) and of
2) 75.11% by weight of a covering composed of an n-butyl acrylate/allyl methacrylate copolymer (II).

2) Grafting of the Methyl Methacrylate onto the Crosslinked Elastomeric Core:

118 g of methyl methacrylate are continuously added over one hour, with stirring, to the reaction mixture obtained above maintained at 80° C. 1.7 g of diisopropylbenzene hydroperoxide in 78 ml of water and 0.42 g of sodium formaldehyde sulphoxylate in 9.58 ml of water are also added at the same time.

The contents of the reactor are maintained at 80° C. for 1.5 hours, after the beginning of the introduction of the methyl methacrylate, and 0.33 g of tert-butyl hydroperoxide and 0.08 g of sodium metabisulphite in 10 ml of water are added to the said contents. The reaction mixture is then maintained at 80° for one hour. At the end of this period, the contents of the reactor are cooled to ambient temperature and the grafted copolymer latex produced is coagulated in a saline solution acidified with concentrated sulphuric acid. The coagulated-product is then filtered, washed and then dried to give a powder constituting the impact additive.

The conversion of the methyl methacrylate during the grafting is quantitative. The impact additive contains a proportion of poly(methyl methacrylate) graft chains representing 19.83% by weight of the additive and has a viscosity in the molten state corresponding to a value equal to 1760 m.g. of the torque of the Brabender rheometer operating under the conditions defined above.

EXAMPLE 9

In Accordance with the Invention

The preparation is carried out in a 2-liter reactor equipped with a stirring device and a temperature recorder and provided with a jacket through which passes a heat-transfer fluid for maintaining the temperature of the reactor.

1) Preparation of the Crosslinked Elastomeric Core of the Impact Additive:

787.5 g of demineralized water, 2.58 of disodium phosphate and 0.42 g of sodium metabisulphite in 7.98 ml of water are introduced, after having degassed with nitrogen, into the reactor described above maintained at ambient temperature and with stirring and then 105 g of sodium lauryl sulphate are dissolved in this mixture as emulsifying agent.

The temperature of the contents of the reactor are then brought to 57° C. and 493.50 g of n-octyl acrylate and 3.38 g of allyl methacrylate are then added simultaneously to the said contents, while maintaining this temperature.

The temperature of the reactor is brought to 63° C. and 0.66 g of potassium persulphate in 14 ml of water is then added to the reaction mixture. The reaction is then allowed to continue for 2 hours and then the temperature of the reactor is brought to 80° C.

The temperature of the reactor is maintained at 80° C. for 1 hour. A crosslinked elastomeric core is obtained, with a conversion of 98.95%, consisting of an n-octyl acrylate/allyl methacrylate copolymer (I).

This core contains, in moles, 1% of allyl methacrylate.

2) Grafting of Methyl Methacrylate onto the Crosslinked Elastomeric Core:

118 g of methyl-methacrylate are continuously added over one hour, with stirring, to the reaction mixture obtained above maintained at 80° C. 1.7 g of diisopropylbenzene hydroperoxide in 78 ml of water and 0.42 g of sodium formaldehyde sulphoxylate in 9.58 ml of water are also added at the same time.

The contents of the reactor are maintained at 80° C. for 1.5 hours, after the beginning of the introduction of the methyl methacrylate, and 0.33 g of tert-butyl hydroperoxide and 0.08 g of sodium metabisulphite in 10 ml of water are added to the said contents. The reaction mixture is then maintained at 80' for one hour. At the end of this period, the contents of the reactor are cooled to ambient temperature and the grafted copolymer latex produced is coagulated in a saline solution acidified with concentrated sulphuric acid. The coagulated product is then filtered, washed and then dried to give a powder constituting the impact additive.

The conversion of the methyl methacrylate during the grafting is 96.17%. The impact additive contains a proportion of poly(methyl methacrylate) graft chains representing 19.82% by weight of the additive and has a viscosity in the molten state corresponding to a value equal to 1300 g.m. of the torque of the Brabender rheometer operating under the conditions defined above.

EXAMPLE 10

1. Preparation of the Crosslinked Elastomeric Core of the Impact Additive:

First Stage: Preparation of the Seed.

The preparation is carried out in a 5-liter reactor equipped with a stirrer, a temperature recorder and a jacket through which passes a heat-transfer fluid for maintaining the temperature of the reactor.

1,100 g of demineralized water and 0.95 g of sodium hydrogencarbonate in 95 g of water are introduced, after having degassed with nitrogen, into this reactor maintained at ambient temperature and with stirring and then 4.76 g of sodium dioctyl sulphosuccinate are dissolved in this mixture as emulsifying agent.

The temperature of the contents of the reactor is then brought to 57° C. and, while maintaining this temperature, 119 g of n-octyl acrylate and 2.56 g of 1,4-butanediol diacrylate are then added simultaneously to the said contents.

The temperature of the reactor is brought to 70° C. and 2.62 g of potassium persulphate, dissolved in 65 g of water, are added to the reaction mixture.

After an induction time of approximately 10 minutes, the temperature rises to 76° C. An emulsified mixture composed of 663 g of demineralized water, 0.66 g of sodium hydrogencarbonate in 66 g of water, 6.43 g of sodium dioctyl sulphosuccinate as emulsifying agent, 1,071 g of n-octyl acrylate and 23.05 g of 1,4-butanediol diacrylate is then added to the reactor over a period of two hours. The temperature is maintained at 70° C. during the addition period. The temperature is then increased to 90° C. and maintained for one hour.

A crosslinked elastomeric seed, denoted by "emulsion (A)", is obtained, with a conversion of 99%, consisting of latex particles with a diameter of 0.130 μm.

Second Stage: Preparation of the Core.

The preparation is carried out in a 5-liter reactor equipped with a stirrer, a temperature recorder and a jacket through which passes a heat-transfer fluid for maintaining the temperature of the reactor.

An emulsified premix (B) is prepared composed of 660 g of demineralized water, 0.66 g of sodium hydrogencarbonate in 66 g of water, 6.43 g of sodium dioctyl sulphosuccinate as emulsifying agent, 1,071 g of n-octyl acrylate and 23.05 g of 1,4-butanediol diacrylate.

The reactor being maintained at room temperature and with stirring, 1,000 g of demineralized water and 1 g of sodium hydrogencarbonate in 100 g of water are introduced, after having degassed with nitrogen, and then 338.88 g of the emulsion (A) obtained during the first stage are dissolved in this mixture.

The temperature of the contents of the reactor is then brought to 57° C. and 120 g of the premix (B) are then added, while maintaining this temperature.

The temperature of the reactor is brought to 70° C. and 2.14 g of potassium persulphate, dissolved in 65 g of water, are added to the reaction mixture.

After an induction time of approximately 10 minutes, the temperature rises to 76° C. 1,505 g of the premix (B) are then added to the reactor over a period of 110 minutes. 5.95 g of diallyl maleate are then added to the remaining 200 g of premix B and the combined mixture is added to the contents of the reactor, while still maintaining the temperature at 70° C., over a period of 10 minutes.

The temperature is then increased to 90° C. and maintained for one hour.

The elastomeric core is obtained, with a conversion of 99%, consisting of latex particles with a Coulter diameter of 0.270 μm.

2. Grafting of Methyl Methacrylate on to the Crosslinked Elastomeric Core 0.54 g of potassium persulphate, dissolved in 30 g of water, is added, with stirring, to the reaction mixture obtained above maintained at 70° C. An emulsified mixture (C), composed of 200 g of demineralized water, 0.35 g of sodium hydrogencarbonate in 35 g of water, 1.34 g of sodium dioctyl sulphosuccinate as emulsifying agent, 267 g of methyl methacrylate and 29.75 g of ethyl acrylate, is then added continuously over 45 minutes.

On completion of this addition, the contents of the reactor are maintained at 90° C. for one hour. At the end of this period, the contents of the reactor are cooled to ambient temperature.

A grafted copolymer latex is obtained, with a conversion of 98.3%, the mean particle diameter of which is 0.285 μm.

This latex is then coagulated in a calcium chloride solution. The coagulated product is then filtered, washed and then dried to give a powder which constitutes the impact additive.

This additive has a viscosity in the molten state corresponding to a value equal to 890 m.g. of the Brabender rheometer torque operating under the conditions defined above.

EXAMPLE 11

Not in Accordance with the Invention

The preparation is carried out according to the same operating conditions as EXAMPLE 10, use being made, for the preparation of the seed, of the crosslinked elastomeric core and for the shell grafted onto the said core, of the same reactants (grafting and crosslinking agents, catalysts, emulsifiers, and the like) in identical amounts by weight, except that, for the preparation of the seed and of the crosslinked elastomeric core, use is made of an amount by weight identical of 2-ethylhexyl acrylate in place of n-octylacrylate.

A grafted copolymer latex is obtained, with a conversion of 99.1%, the mean particle diameter of which is 0.315 μm.

This latex is then coagulated in a calcium chloride solution. The coagulated product is then filtered, washed and then dried to give a powder which constitutes the impact additive.

This additive has a viscosity in the molten state corresponding to a value equal to 1,725 m.g. of the Brabender rheometer torque operating under the conditions defined above.

EXAMPLE 12

Not in Accordance with the Invention

The preparation is carried out according to the same operating conditions as Example 10, use being made, for the preparation of the seed, of the crosslinked elastomeric core and for the shell grafted onto the said core, of the same reactants (grafting and crosslinking agents, catalysts, emulsifiers, and the like) in identical amounts by weight, except that, for the preparation of the seed and of the crosslinked elastomeric core, use is made of an identical amount by weight of butyl acrylate in place of n-octyl acrylate and of an identical molar amount, with respect to the butyl acrylate monomer of 1,4-butanediol diacrylate.

A grafted copolymer latex is obtained, with a conversion of 98.6%, the mean particle diameter of which is 0.335 μm.

This latex is then coagulated in a calcium chloride solution. The coagulated product is then filtered, washed and then dried to give a powder which constitutes the impact additive.

This additive has a viscosity in the molten state corresponding to a value equal to 1,725 m.g. of the Brabender rheometer torque operating under the conditions defined above.

Preparation and characteristics of the resin compositions according to the invention:

1. The description is given below of the preparation of a PVC-based resin composition and the impact strength characteristics of test specimens manufactured from this resin composition are given.

The preparation is carried out at 25° C., in a mixer of the Papenmeir type, of a composition containing (parts by weight):
- 100 parts of a vinyl chloride homopolymer of E-value=67,
- 2.5 parts of lead phosphate,
- 1.5 parts of calcium stearate,
- 6 parts of calcium carbonate,
- 4 parts of $TiO_2$,
- 1 part of a processing aid (Metablen P550, sold by the company Metablen B.V.),
- 0.2 part of 12 stearic acid,
- 0.3 part of Loxiol G60 (internal lubricant),
- 4 parts of polyethylene waxes (external lubricant) and,
- x parts of an impact additive prepared according to one of Examples 1 to 9.

From the composition thus obtained, test specimens are prepared for carrying out the impact strength determination tests.

To prepare the test specimens for the Charpy impact tests, the PVC resin compositions resulting from the mixtures of the abovementioned ingredients are calendered at 175° C. for 6 minutes on a calender of the Schwanbenthan type and then moulded at 190° C. on a Derragon press, for 5 minutes under a pressure of 200 bar, in the form of panels, the said panels being cooled in the press.

The test specimens are cut out using a circular saw and then a notcher for the notched Charpy impact tests, according to BS standard 2782.

The thickness of the test specimens, the shape of which is that stipulated by the abovementioned standard, is 2.5 mm.

To prepare the test specimens for the low-temperature impact strength test according to ISO standard 6603.2 1989 (F), the resin composition defined above is mixed in a twin-screw extruder of the Krauss-Maffei KMD 25 type, then introduced into a die, which makes it possible to obtain a strip with a thickness of 1 mm, and then cut up into 7 cm.×7 cm squares.

The results are combined in the tables below.

In Table 1, the source of the impact additive (example) and its content in the PVC resin composition as described above, in parts by weight per 100 parts by weight of the said resin (phr), have been shown in the "impact additive" column. The "Charpy impact" strength tests are carried out according to BS standard 2782 at a temperature of 23°±1° C. The fracture energy is calculated by taking the mean of the ductile and brittle fracture energies.

The low-temperature impact strength tests are reported in Table 2. As in Table 1, the source of the said impact additive and its content (phr) in the PVC resin composition have been shown in the "impact additive" column.

In Tables 1 and 2, the compositions 9(c), 10(c), 11(c), 12(c), 21(c), and 22(c) are not in accordance with the invention.

2. The preparation of a resin composition based on poly(butylene terephthalate)(PBT) is described below and the impact strength characteristics of test specimens manufactured from this resin composition are given.

The preparation is carried out at 25° C. of a resin composition according to the invention containing (parts by weight):
- 80 parts of a poly(butylene terephthalate) homopolymer (Calanex 1700A, sold by the company Hoechst Celanese),
- 20 parts of an impact additive prepared according to one of Examples 10 to 12.

The mixture is dried for at least 10 hours under a vacuum of 1 bar at 80° C.

This mixture is homogenized by extrusion on a Buss PR46 Ko-Knewader, followed by granulation of the rod obtained. The extrusion conditions are as follows:

| Ko-Kneader - | temperature of the screw: | 230° C. |
| | temperature zone 1: | 260° C. |
| | temperature zone 2: | 250° C. |
| | speed: | 120 revolutions/minute |
| Extruder | temperature of the screw: | 240° C. |
| | temperature zone 1: | 240° C. |
| | die: | 230° C. |
| | speed: | 94 revolutions/minute |

The test specimens for the Izod impact tests are prepared by injection moulding the granules obtained above on a Visumat 5000 injection press. These granules are dried for at least 10 hours under a vacuum of 1 bar at 80° C. Injection is carried out under the following conditions:

| Injection temperature | 240° C. |
| Injection rate: | 10% |
| Injection pressure: | 80 bar |
| Hold pressure: | 50 bar |
| Hold time: | 20 seconds |

These test specimens, the shape and thickness of which are those described in ISO standard 180, are then notched.

The results obtained are presented in the table below. In Table 3, the source of the impact additive (Example) has been shown in the "impact additive" column. The fracture energy according to ISO standard 180 at a temperature of 23°±1° C., calculated by taking the mean of the ductile and brittle fractures with respect to ten test specimens, has been reported in the "ambient temperature impact" column. The fracture energy according to ISO standard 180 at a temperature of −20°±1° C., calculated by taking the mean of the ductile and brittle fractures with respect to ten test specimens, has been reported in the "cold impact" column.

3. The preparation of a resin composition based on poly(1,1-difluoroethylylene)(PVDF) is described below and the impact strength characteristics of test specimens manufactured from this resin composition are given.

The preparation is carried out at 25° C. of a resin composition according to the invention containing (parts by weight):

95 parts of a poly(1,1-difluoroethylene) homopolymer (Kynar 1000, sold by the company ELF ATOCHEM S.A.), 5 parts of an impact additive prepared according to Examples 10 and 12.

The mixture is homogenized by extrusion on a Werner 40, followed by granulation of the rod obtained. The extrusion conditions are as follows:

| temperature zone 1 | 195° C. |
| temperature zone 2 | 230° C. |
| temperature zone 3 | 215° C. |
| temperature zone 4 | 240° C. |

The test specimens for the Izod impact and Charpy impact tests are prepared by injection moulding the granules obtained above on a Visumat 5000 injection press in the shape of sheet of 100 mm.times.100 mm. These test specimens, the shape and thickness of which are those described in ISO standard 179 and ISO standard, are punched with tool.

The results obtained are presented in the table 4. In this Table 4, the source of the impact additive (Example) has been shown in the "impact additive" column. The fracture energy according to ISO standard 180 at a temperature of 23°±1° C., calculated by taking the mean of the ductile and brittle fractures with respect to ten test specimens, has been reported in the "ambiant temperature impact IZOD" column. The fracture energy according to ISO standard 179 at a temperature of 23°±1° C., calculated by taking the mean of the ductile and brittle fractures with respect to ten test specimens, has been reported in the "ambient temperature impact CHARPY".

The fracture energy according to ISO standard 179 at a temperature of −40°±1° C., calculated by taking the mean of the ductile and brittle fractures with respect to ten test specimens, has been reported in the "cold impact, CHARPY" column.

TABLE 1

| | IMPACT ADDITIVE | | CHAREY IMPACT | |
| --- | --- | --- | --- | --- |
| COMPOSITION | Source (Example) | Content (phr) | Fracture Energy (KJ/M$^2$) | % of DUCTILE Fracture |
| 1 | 1 | 7 | 34.2 | 60 |
| 2 | 1 | 7.5 | >52 | 100 |
| 3 | 3 | 7 | 48 | 100 |
| 4 | 3 | 7.5 | >52 | 100 |
| 5 | 4 | 7 | 46.5 | 100 |
| 6 | 4 | 7.5 | >52 | 100 |
| 7 | 2 | 7 | 43.1 | 80 |
| 8 | 2 | 8 | 52 | 100 |
| 9 (c) | 6 | 7 | 15.7 | 0 |
| 10 (c) | 6 | 8 | 48.6 | 90 |
| 11 (c) | 7 | 7 | 12.4 | 0 |
| 12 (c) | 7 | 7.5 | 39 | 70 |
| 13 | 8 | 7 | 15.2 | 0 |
| 14 | 8 | 7.5 | >51 | 100 |
| 15 | 9 | 7 | >43 | 100 |
| 16 | 9 | 7.5 | >52 | 100 |

TABLE 2

| | IMPACT ADDITIVE | | LOW-TEMPERATURE IMPACT | |
| --- | --- | --- | --- | --- |
| COMPOSITION | Source (example) | Content (phr) | Temperature Of the test (in ° C.) | Fracture Energy (in KJ/M$^2$) |
| 17 | 1 | 6 | −10 | 23.1 |
| | | | −20 | 19.5 |
| | | | −30 | 11.5 |
| | | | −40 | 9.1 |
| 18 | 3 | 6 | −10 | 22.6 |
| | | | −20 | 20.8 |
| | | | −30 | 5 |
| | | | −40 | — |
| 19 | 4 | 6 | −10 | 25.6 |
| | | | −20 | 19.6 |
| | | | −30 | 8.2 |
| | | | −40 | 2.4 |

TABLE 2-continued

| COMPOSITION | IMPACT ADDITIVE Source (example) | IMPACT ADDITIVE Content (phr) | LOW-TEMPERATURE IMPACT Temperature Of the test (in ° C.) | LOW-TEMPERATURE IMPACT Fracture Energy (in KJ/M$^2$) |
|---|---|---|---|---|
| 20 | 5 | 6 | −10 | 25.9 |
|  |  |  | −20 | 19.3 |
|  |  |  | −30 | 7.6 |
|  |  |  | −40 | 4.6 |
| 21 (c) | 7 | 6 | −10 | 18 |
|  |  |  | −20 | 17 |
|  |  |  | −30 | 5.4 |
|  |  |  | −40 | 2.5 |
| 22 (c) | 6 | 6 | −10 | 22 |
|  |  |  | −20 | 15 |
|  |  |  | −30 | 5.1 |
|  |  |  | −40 | 2.1 |

TABLE 3

| IMPACT ADDITVE | AMBIENT TEMPERATURE IMPACT (kJ/m$^2$) | COLD IMPACT (kJ/m$^2$) |
|---|---|---|
| PBT* | 69.3 | 11.3 |
| Example 10 | 62 | 16.1 |
| Example 11 | 56.8 | 8.4 |
| Example 12 | 74 | 8.8 |

*COMPOSITION Based on PBT (Without Impact Modifier)

| IMPACT ADDITIVE | AMBIENT TEMPERATURE IMPACT IZOD (kJ/m$^2$) | AMBIENT TEMPERATURE IMPACT, CHARPY (kJ/m$^2$) | COLD IMPACT, CHARPY (kJ/m$^2$) |
|---|---|---|---|
| PVDF* | 7.5 | 8 | 3.7 |
| Example 10 | 62.8 | 78.2 | 15.6 |
| Example 11 | 49.3 | 60.3 | 11.1 |

*COMPOSITION Based on PVDF (Without Impact Modifier)

From a review of the examples and the specification, it is clear that the core is of two types: with a covering composition and without a covering composition. When with a covering composition, said core contains above zero, preferably at least 5%, more preferably at least 10%, by weight of the covering composition, with the preferred maximum percentage being about 80% by weight.

Also, the preceding examples can be repeated with similar success by substituting the generically or specifically described reactants and/or operating conditions of this invention for those used in the preceding examples.

The entire disclosure of all applications, patents and publication, cited above and below, and of corresponding French 95/12706, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

In this specification and the following claims, the expression "ranging from 7 to 9," e.g., from 5 to 12 and the like includes values x and y, e.g., 5 and 12. Also, the abbreviation "m.g." represents meter-gram(s).

The invention claimed is:
1. A polyvinyl chloride composition containing a core/shell impact additive, said impact additive comprising:
   a) 70% to 90% by weight of a crosslinked elastomeric core which is composed:
      1) of 20% to less than 100% by weight of a nucleus composed of a copolymer (I) of an n-alkyl acrylate, the alkyl group having a carbon number ranging from 5 to 12, of a polyfunctional crosslinking agent possessing unsaturated groups in its molecule, at least one of which is a vinyl group and optionally of a polyfunctional grafting agent possessing unsaturated groups in its molecule, at least one of which is an allyl group, and
      2) of more than 0 and not more than 80% by weight, of a covering composed of a copolymer (II) of n-alkyl acrylate, the alkyl group of which has a carbon number ranging from 4 to 12, and a grafting agent possessing allyl groups, the said covering containing a molar amount of grafting agent ranging from 0.05% to 2.5%, said grafting agent having only allyl functional groups, all having the same reactivity and,
   b) 30% to 10% by weight of a shell grafted onto the said core composed of a polymer of an alkyl methacrylate, the alkyl group of which has a carbon number ranging from 1 to 4, or alternatively of a statistical copolymer of an alkyl methacrylate, the alkyl group of which has a carbon number ranging from 1 to 4, and of an alkyl acrylate, the alkyl group of which has a carbon number ranging from 1 to 8, containing a molar amount of alkyl acrylate ranging from 5% to 40%, or alternatively composed of a styrene acrylonitrile copolymer.

2. A composition according to claim 1, characterized in that the said impact additive comprises from
   a) 75% to 85% of a crosslinked elastomeric core,
   b) 25% to 15% of a shell grafted onto the said core.

3. A composition according to claim 1, characterized in that the alkyl group of the n-alkyl acrylate of the copolymer (I) has a carbon number ranging from 5 to 8 and that the alkyl group of the n-alkyl acrylate of the copolymer (II) has a carbon number ranging from 4 to 8.

4. A composition according to claim 1, characterized in that the alkyl group of the alkyl acrylates of the mixture forming part of the copolymers (I) and/or (II) has a carbon number ranging from 4 to 8.

5. A composition according to claim 1, characterized in that the crosslinking agent is chosen from derivatives possessing at least two vinyl double bonds of $CH_2$=C<.

6. A composition according to claim 1, characterized in that the cross linking agent is chosen from derivatives possessing one or a number of vinyl double bonds mid at least one allyl double bond of $CH_2$=CH—$CH_2$—.

7. a composition according to claim 1, characterized in that the crosslinking agent is 1,4-butanediol diacrylate.

8. A composition according to claim 1, characterized in that the crosslinking agent is allyl acrylate or methacrylate.

9. A composition according to claim 1, characterized in that the grafting agent is chosen from derivatives possessing at least two allyl double bonds of $CH_2$=CH—$CH_2$—.

10. A composition according to claim 1, characterized in that the grafting agent is chosen from derivatives possessing one or more allyl double bonds and at least one vinyl double bond.

11. A composition according to claim 1, characterized in that the grafting agent is diallyl maleate.

12. A composition according to claim 1, characterized in that the grafting agent is allyl acrylate or methacrylate.

13. A composition according to claim 1, characterized in that the nucleus of the crosslinked core has a molar amount of crosslinking agent and optionally of grafting agent of between 0.5% and 1.5%.

14. A composition according to claim 1, characterized in that the covering of the crosslinked core has a molar amount of grafting agent of between 0.5% and 1.5%.

15. A composition according to claim 1, characterized in that the statistical copolymer of the shell has a molar amount of alkyl acrylate of between 10% and 20%.

16. A composition according to claim 1, characterized in that the n-alkyl acrylates used to form the copolymer (I) are n-pentyl acrylate, n-hexyl acrylate n-heptyl acrylate and n-octyl acrylate.

17. A composition according to claim 1, characterized in that the n-alkyl acrylates used to form the copolymer (II) are n-butyl acrylate, n-pentyl acrylate, n-hexyl acrylate, n-heptyl acrylate and n-octyl acrylate.

18. A composition according to claim 16, characterized in that the n-alkyl acrylate for forming the copolymers (I) and (II) is n-pentyl acrylate.

19. A composition according to claim 16, characterized in that the n-alkyl acrylate for forming the copolymers (I) and (II) in n-hexyl acrylate.

20. A composition according to claim 16, characterized in that the n-alkyl acrylate for forming the copolymers (I) and (II) is n-octyl acrylate.

21. A composition according to claim 16, characterized in that the n-alkyl acrylate for forming the copolymers (I) and (II) is n-octyl acrylate.

22. A composition according to claim 16, characterized in that the n-alkyl acrylate for forming the copolymer (I) is n-octyl acrylate and that the n-alkyl acrylate for forming the copolymer (I) is n-octyl acrylate and that the n-alkyl acrylate for forming the copolymer (II) is n-butyl acrylate.

23. A composition according to claim 1, characterized in that the linear or branched alkyl acrylates constituting the mixture of alkyl acrylates used for forming the copolymers (I) and/or (II) are ethyl acrylate, n-propyl acrylate, n-butyl acrylate, amyl acrylate, 2-methylbutyl acrylate, 2-ethylhexyl acrylate, n-hexyl acrylate, n-octyl acrylate, n-decyl acrylate, n-dodecyl acrylate and 3,5,5-trimethylhexyl acrylate.

24. A composition according to claim 23, characterized in that use is made of an amount by weight of n-alkyl acrylate at least equal to 10% by weight of the mixture of alkyl acrylates.

25. A composition according to claim 24, characterized in that use is made of an amount by weight of n-alkyl acrylate of between 20% and 80% by weight of the mixture of alkyl acrylates.

26. A composition according to claim 1 characterized in the n-alkyl acrylate is n-octyl acrylate.

27. A composition according to claim 1 characterized in that the alkyl methacrylate used to form the shell is methyl methacrylate.

28. A thermoplastic polymer composition containing a core/shell impact additive, said impact additive comprising:
a) 70% to 90% by weight of a crosslinked elastomeric core which is composed:
1) of 20% to less than 100% by weight of a nucleus composed of a copolymer (I) of an n-alkyl acrylate, the alkyl group of which has a carbon number ranging from 5 to 12, and of a polyfunctional crosslinking agent possessing unsaturated groups in its molecule, at least one of which is of a vinyl group, and optionally of a polyfuctional grafting agent possessing unsaturated groups in its molecule, at least one of which is an allyl group,
2) of an amount above 0%, but not more than 80% by weight, of a covering composed of a copolymer (II) of n-alkyl acrylate, the alkyl group of which has a carbon number ranging from 4 to 12, and a grafting agent possessing allyl groups, the said covering containing a molar amount of grafting agent ranging from 0.05% to 2.5%, said grafting agent having only allyl functional groups, all having the same reactivity, and
b) 30% to 10% by weight of a shell grafted onto the said core composed of a polymer of an alkyl methacrylate, the alkyl group of which has a carbon number ranging from 1 to 4, or alternatively of a statistical copolymer of an alkyl methacrylate, the alkyl group of which has a carbon number ranging from 1 to 4, and of an alkyl acrylate, the alkyl group of which has a carbon number ranging from 1 to 8, containing a molar amount of alkyl acrylate ranging from 5% to 40%, or alternatively composed of a styrene-acrylonitrile copolymer.

29. A composition according to claim 28, characterized in that the thermoplastic polymer is composed of a least one polycondensate selected from the group consisting of polyesters, poly(butylenes teraphthalate), polyamides, polyester-etheramides, polycarbonates and mixtures thereof.

30. A composition according to claims 28, characterized in that the thermoplastic polymer is composed of one or a number of polymers selected from the group consisting of poly(alkyl methacrylate)s, particular poly (methyl methacrylate), optionally superchlorinated vinyl chloride homopolymers, copolymers which result from the copolymerization of vinyl chloride with at least one ethylenically unsaturated comonomer and which contain at least 80% by weight of polymerized vinyl chloride; 1,1-dichloroethylene homopolymer, and 1,1-difluoroethylene homopolymer.

31. A composition according to claim 30, characterized in that the thermoplastic polymer is a vinyl chloride homopolymer.

32. A composition according to claim 29, characterized in that the thermoplastic polymer is a poly(butylenes teraphthalate).

33. A composition according to claim 28 characterized in that the content of impact additive is between 1 part and 30 parts by weight per 100 parts by weight of the thermoplastic polymer used.

34. A composition according to claim 33, characterized in that the content of impact additive is between 5 parts and 10 parts by weight per 100 parts by weight of the thermoplastic polymer used.

35. A composition according to claim 30, characterized in that the thermoplastic polymer is a 1,1-difluoroethylene homopolymer.

36. A composition according to claim 35, wherein the covering constitutes at least 5% by weight of said core.

37. A composition according to claim 36, wherein the covering constitutes at least 10% by weight of said core.

38. A composition according to claim 1 wherein the core does not contain a covering.

39. A composition according to claim 28, wherein said impact additive comprises:
a) 70–90% by weight of a crosslinked elastomeric core compound of:
1) 20–90% by weight of a nucleus comprising a copolymer of n-octyl acrylate and 1,4-butanediol diacrylate, and 2) surrounding said nucleus above 0% but not more than 80% by weight of a covering comprising a copolymer of n-octyl acrylate and diallyl maleate, and b) surrounding said core, 30–10% by weight of a shell grafted onto the said core, said shell composed of a polymer of an alkyl methacrylate, the alkyl group of which has a carbon number ranging from 1 to 4, or alternatively of a statistical copolymer of an alkyl methacrylate, the alkyl group of which has a carbon number ranging from 1 to 4, and of an 4lkyl 4crylate, the alkyl group of which has a carbon number ranging from 1 to 8, containing 2, molar amount of alkyl acrylate ranging from 5% to 40%, or alternatively composed of a styrene-acrylonitrile copolymer.

40. A composition according to claim 39, wherein said nucleus is about 90% by weight of said core and, said covering is about 10% by weight.

41. A composition according to claim 40, wherein said shell consists essentially of poly(methyl methacrylate).

42. A composition according to claim 39, wherein said impact additive comprises from:
a) 75% to 85% of said crosslinked elastomeric core,
b) 25% to 15% of said shell grafted onto the said core.

43. A composition according to claim 39, or characterized in that the alkyl methacrylate used to form the shell is methyl methacrylate.

44. A composition according to claim 39, wherein the covering of the crosslinked core has a molar amount of grafting agent of between 0.5% and 1.5%.

45. A composition according to claim 1, wherein a) 2) is present in an amount more than 0% by weight.

46. A composition according to claim 1, wherein the composition contains a major amount of polyvinyl chloride and a minor amount of said impact additive.

47. A thermoplastic polymer composition containing a core/shell impact additive, said impact additive comprising:

a) 70% to 90% by weight of a crosslinked elastomeric core which is composed:
1) of 20% to less than 100% by weight of a nucleus composed of a copolymer (I) of an n-alkyl acrylate, the alkyl group having a carbon number ranging from 5 to 12, a polyfunctional crosslinking agent possessing unsaturated groups in its molecule, at least one of which is a vinyl group, and diallyl maleate as a grafting agent, and 2) of more than above 0% but not more than 80% by weight of a covering composed of a copolymer (II) of the n-alkyl acrylate of copolymer (I)

the polyfunctional crosslinking agent of copolymer (I) and diallyl maleate as a grafting agent in a molar amount from 0.05% to 2.5% of copolymer (II)

wherein said core is produced by simultaneously introducing the polyfunctional crosslinking agent and the diallyl maleate into the reaction mixture and the production of the covering is carried out at a temperature greater than that used for the preparation of the nucleus, and b) 30% to 10% by weight of a shell grafted onto the said core composed of a polymer of an alkyl methacrylate, the alkyl group of which has a carbon number ranging from 1 to 4 or alternatively of a statistical copolymer of an alkyl methacrylate, the alkyl group of which has a carbon number ranging from 1 to 4, and of an alkyl acrylate, the alkyl group of which has a carbon number ranging from 1 to 8, containing a molar amount of alkyl acrylate ranging from 5% to 40%, or alternatively composed of a styrene-acrylonitrile copolymer.

* * * * *